(12) United States Patent
Lainani

(10) Patent No.: US 12,218,847 B2
(45) Date of Patent: Feb. 4, 2025

(54) STATICALLY-CONFIGURED INTERNET PROTOCOL (IP) NETWORK TRAFFIC SHAPING FOR ADAPTATIVE MODULATION AND CODING DATA LINKS

(71) Applicant: Itron, Inc., Liberty Lake, WA (US)

(72) Inventor: Madani Lainani, Paris (FR)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 18/146,062

(22) Filed: Dec. 23, 2022

(65) Prior Publication Data

US 2024/0214316 A1 Jun. 27, 2024

(51) Int. Cl.
H04L 47/22 (2022.01)
H04L 41/0816 (2022.01)
H04L 47/263 (2022.01)

(52) U.S. Cl.
CPC .......... H04L 47/22 (2013.01); H04L 41/0816 (2013.01); H04L 47/263 (2013.01)

(58) Field of Classification Search
None
See application file for complete search history.

(56) References Cited

U.S. PATENT DOCUMENTS

| | | | |
|---|---|---|---|
| 7,330,433 B2 | 2/2008 | Shao et al. | |
| 7,689,162 B2 * | 3/2010 | Thesling | H04L 1/0083 455/427 |
| 8,385,199 B1 | 2/2013 | Coward et al. | |
| 8,839,388 B2 | 9/2014 | Raleigh | |
| 9,014,026 B2 | 4/2015 | Raleigh | |
| 9,887,923 B2 | 2/2018 | Chorafakis et al. | |
| 10,873,533 B1 | 12/2020 | Ismailsheriff et al. | |
| 2001/0055303 A1 * | 12/2001 | Horton | H04L 47/10 370/254 |
| 2006/0215556 A1 * | 9/2006 | Wu | H04W 4/12 370/230 |
| 2008/0212517 A1 * | 9/2008 | Thesling | H04L 5/023 370/316 |
| 2013/0230048 A1 * | 9/2013 | Liu | H04L 45/745 370/392 |
| 2014/0269961 A1 * | 9/2014 | Gao | H04L 1/0027 375/267 |

FOREIGN PATENT DOCUMENTS

| | | |
|---|---|---|
| EP | 2392153 B1 | 7/2015 |
| EP | 3143736 B1 | 7/2018 |
| EP | 3172876 B1 | 11/2020 |

* cited by examiner

*Primary Examiner* — Atta Khan

(74) *Attorney, Agent, or Firm* — Lee & Hayes, P.C.

(57) ABSTRACT

A method of traffic shaping on an adaptive modulation and coding (AMC) data link may include, with a traffic shaping configuration agent, fetching from a neighbor routing table stored on a network interface card (NIC) data defining a first modulation of a data link and a first physical layer data transmission rate associated with a first media access control (MAC) address. The traffic shaping configuration agent may further identify a first maximum achievable goodput for the first modulation and the first physical layer data transmission rate and reconfigure an operating system (OS) traffic shaping implementation based on the first maximum achievable goodput.

20 Claims, 8 Drawing Sheets

STATICALLY-CONFIGURED INTERNET PROTOCOL (IP) NETWORK TRAFFIC SHAPING FOR ADAPTATIVE MODULATION AND CODING DATA LINKS

TECHNICAL FIELD

The present disclosure relates generally to network traffic management. Specifically, the present disclosure relates to systems and methods for statically-configured internet protocol (IP) network traffic shaping for adaptive modulation and coding (AMC) data links.

BACKGROUND

Computing networks are ubiquitous throughout the world to allow for the sharing of data and information across various types of networks. Because a great percentage of the data being shared must be transmitted based on an agreement or expectation of a level of quality of service (QOS), aspects of the network services such as packet loss, bit rate, throughput, transmission delay, availability, and jitter, among others must be maintained at a defined level. The QoS may focus on traffic prioritization and resource reservation control mechanisms to provide different priorities to different applications, users, or data flows, or to guarantee a certain level of performance to a data flow.

Traffic shaping may be utilized to control a rate at which data is sent on a network interface and to better utilize network bandwidth and system resources. However, use of traffic shaping methods and techniques on an adaptive modulation and coding (AMC) communication link may lead to under-utilizing and/or over-utilizing link bandwidth. This may be due to, for example, the use of a traffic shaping implementation originally intended for fixed data rate communication links and the shaping rate being configured statically.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
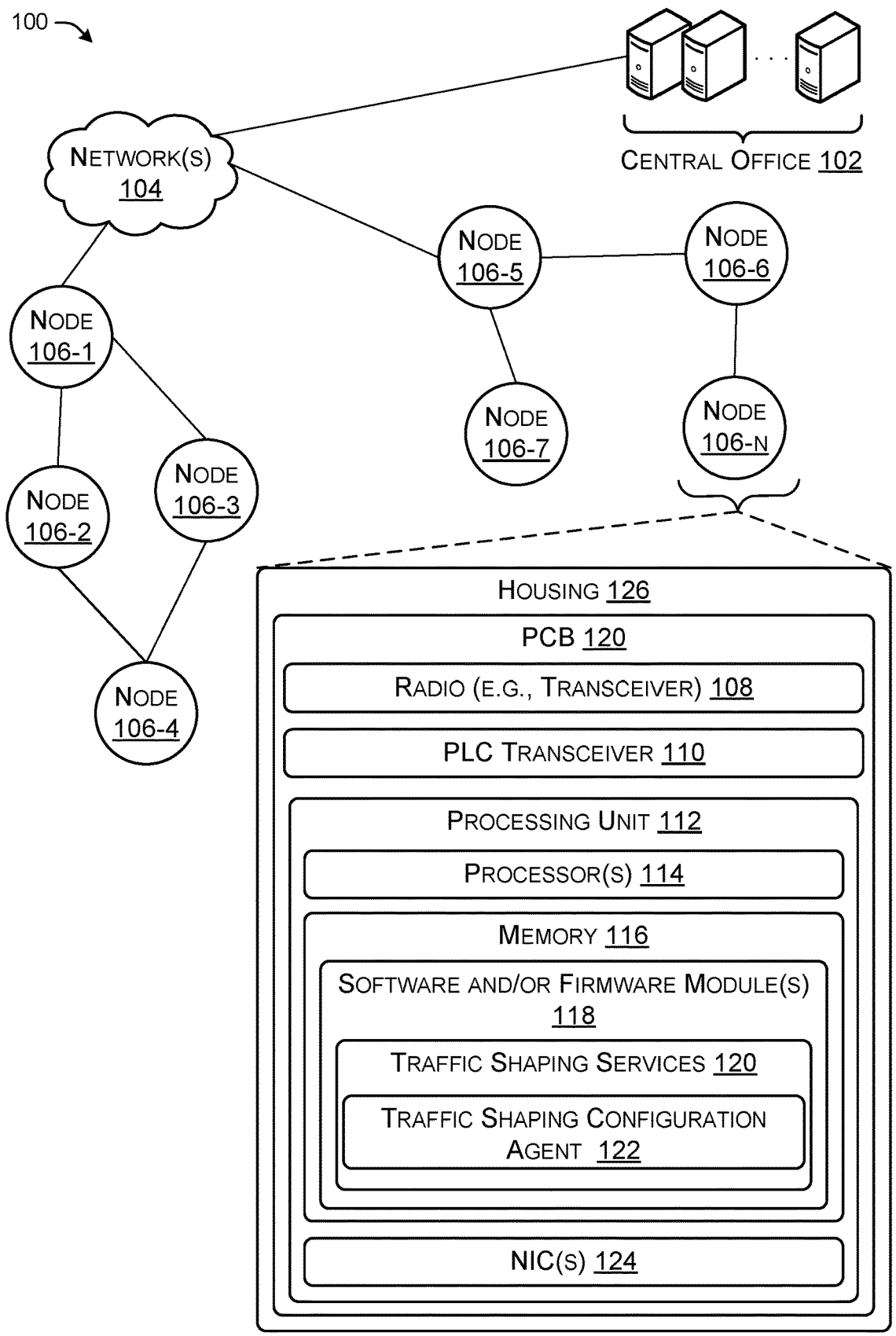
FIG. 1 is a diagram showing a high-level view of a network including nodes configured with traffic shaping service elements, according to an example of the principles described herein.

Computer networks are ubiquitously used throughout the world to transmit data between two different computing devices. It is beneficial to optimize or guarantee performance, improve latency, or increase usable bandwidth for some kinds of data packets transmitted within the computer network by delaying other kinds of data packets. Traffic shaping may include any bandwidth management methods utilized within a computer network. to delay some or all datagrams in order to bring the datagrams into compliance with a desired traffic profile. A datagram is a self-contained, independent entity of data carrying sufficient information to be routed from the source to the destination computer without reliance on earlier exchanges between this source and destination computer and the transporting network.

An adaptive modulation and coding (AMC) data link may be used in wireless communications as a means of matching of the modulation, coding and other signal and protocol parameters to conditions on a radio link. These conditions may include, for example, the pathloss, the interference due to signals coming from other transmitters, the sensitivity of the receiver, the available transmitter power margin, other conditions, and combinations thereof. In past instances, utilization of traffic shaping on an AMC communication link may lead to under-utilization or over-utilization of actual link bandwidth.

When using traffic shaping methods and techniques on an adaptive modulation and coding (AMC) data link, a mismatch may occur between a configured data shaping rate and current capacity of the actual data link. For example, a routing device within, for example, a radio frequency (RF) mesh network, may have, for example, three different modulations including a 300 kilobits per second (Kbps) data transfer rate, a 600 Kbps data transfer rate, and a 2.4 megabits per second (Mbps) data transfer rate at the physical layer (PHY) or layer 1 (L1) of the open systems interconnection (OSI) model of computer networking. However, a goodput (a portmanteau of good and throughput) may be defined as the application-level throughput of a communication or the number of useful information bits delivered by the network to a certain destination per unit of time. The maximum goodput from an application standpoint may be, for example, 85 Kbps for the 300 Kbps PHY data rate, 160 Kbps for the 600 Kbps PHY data rate, and 750 Kbps for the 2.4 Mbps PHY data rate. The difference or loss between the data transfer rates of the PHY layer and the maximum goodput of the application(s) may be due to, for example, encapsulation techniques and data processing techniques utilized at each OSI layer of the system.

In one example, the routing device described in the above example, at deployment time, may experience good or very good conditions were the modulation selected at that time may be the 600 Kbps data rate. Thus, an administrator may configure the network to send data across the network at the 160 Kbps maximum goodput. In an example where the modulation of the routing device is degraded or downgraded due to, for example, an object is impeding data transmission or weather conditions worsen, such that the PHY data rate is downgraded to 300 Kbps (an 85 Kbps maximum goodput), the data link would be over-utilized leading to an impact on the network and system resources.

In one example, the routing device described in the above example, at deployment time, may experience good or very good conditions were the modulation selected at that time may be the 600 Kbps data rate (160 Kbps goodput). However, in this example, the routing device, at deployment, may have had an object impeding data transmission or abnormal weather conditions that were initially obstructing data transmission. As the object or weather condition is removed and the routing device is no longer experiencing that degradation of signal, the modulation may be upgraded to the 2.4 Mbps data rate (750 Kbps goodput). In this scenario, the data link is being under-utilized due to the static configuration of the shaping rate.

The present systems and methods provide for a computing system that is, at all times, aware of the PHY modulation utilized by an AMC network interface card (NIC) and is able to adapt a shaping rate of a traffic shaping configuration when a modulation change occurs. The systems and methods may dynamically adjust the traffic shaping configuration based on a modulation-to-maximum-goodput mapping table and/or based on computing an optimal shaping rate that is based on data packet transmission statistics for the link.

Overview

Examples described herein provide a method of traffic shaping on an adaptive modulation and coding (AMC) data link may include, with a traffic shaping configuration agent, fetching from a neighbor routing table stored on a network interface card (NIC) data defining a first modulation of a data link and a first physical layer data transmission rate associated with a first media access control (MAC) address. The traffic shaping configuration agent may further identify a first maximum achievable goodput for the first modulation and the first physical layer data transmission rate and reconfigure an operating system (OS) traffic shaping implementation based on the first maximum achievable goodput.

Identifying the first maximum achievable goodput for the first modulation and the first physical layer data transmission rate may include looking up the first modulation and first physical layer data transmission rate in a modulation to maximum achievable goodput table associated with the traffic shaping configuration agent and determining the first maximum achievable goodput for the first modulation and first physical layer data transmission rate. The modulation to maximum achievable goodput table may be hardcoded to a data storage device associated with the traffic shaping configuration agent.

The method may further include detecting a change in the first modulation associated with the MAC address (e.g., a MAC address of a current default next hop node), the first physical layer data transmission rate associated with the first MAC address, or combinations thereof as defined by the neighbor routing table. Further, the traffic shaping configuration agent may identify a second maximum achievable goodput for a second modulation and a second physical layer data transmission rate and reconfigure the OS traffic shaping implementation based on the second maximum achievable goodput. Identifying the second maximum achievable goodput for the second modulation and the second physical layer data transmission rate may include looking up the second modulation and second physical layer data transmission rate in a modulation to maximum achievable goodput table associated with the traffic shaping configuration agent. Identifying the second maximum achievable goodput may further include determining the second maximum achievable goodput for the second modulation and second physical layer data transmission rate.

The first targeted goodput is defined at least in part on a percentage value of the first maximum achievable goodput. The percentage value of the first maximum achievable goodput may be user-configured.

Examples described herein also provide a device including a processor and a non-transitory computer-readable media storing instructions that, when executed by the processor, causes the processor to perform operations. The operations may include fetching, from a neighbor routing table stored on a network interface card (NIC), data defining a first modulation of a data link and a first physical layer data transmission rate associated with a first media access control (MAC) address. The operations may also include identifying a first maximum achievable goodput for the first modulation and the first physical layer data transmission rate and reconfiguring an operating system (OS) traffic shaping implementation based on the first maximum achievable goodput.

Identifying the first maximum achievable goodput for the first modulation and the first physical layer data transmission rate may include looking up the first modulation and first physical layer data transmission rate in a modulation to maximum achievable goodput table associated with a traffic shaping configuration agent and determining the first maximum achievable goodput for the first modulation and first physical layer data transmission rate. The modulation to maximum achievable goodput table may be hardcoded to a data storage device associated with the traffic shaping configuration agent.

The operations may further include detecting a change in the first modulation associated with the first MAC address, the first physical layer data transmission rate associated with the first MAC address, or combinations thereof as defined by the neighbor routing table. Further, the operations may include identifying a second maximum achievable goodput for a second modulation and a second physical layer data transmission rate and reconfiguring the OS traffic shaping implementation based on the second maximum achievable goodput.

Identifying the second maximum achievable goodput for the second modulation and the second physical layer data transmission rate may include looking up the second modulation and second physical layer data transmission rate in a modulation to maximum achievable goodput table associated with a traffic shaping configuration agent and determining the second maximum achievable goodput for the second modulation and second physical layer data transmission rate. The operations may further include defining the first maximum achievable goodput based at least in part on a percentage value of the first maximum achievable goodput. The percentage value of the first maximum achievable goodput may be user-configured. The device may be an edge device.

Examples described herein also provide a non-transitory computer-readable medium storing instructions that, when executed, cause a processor to perform operations. The operations may include fetching, from a neighbor routing table stored on a network interface card (NIC), data defining a first modulation of a data link and a first physical layer data transmission rate associated with a first media access control (MAC) address. The operations may further include identifying a first maximum achievable goodput for the first modulation and the first physical layer data transmission rate and reconfiguring an operating system (OS) traffic shaping implementation based on the first maximum achievable goodput.

Identifying the first maximum achievable goodput for the first modulation and the first physical layer data transmission rate may include looking up the first modulation and first physical layer data transmission rate in a modulation to maximum achievable goodput table associated with a traffic shaping configuration agent and determining the first maximum achievable goodput for the first modulation and first physical layer data transmission rate. The modulation to maximum achievable goodput table may be hardcoded to a data storage device associated with the traffic shaping configuration agent.

The operations may further include detecting a change in the first modulation associated with the first MAC address, the first physical layer data transmission rate associated with the first MAC address, or combinations thereof as defined by the neighbor routing table. Further, the operations may include identifying a second maximum achievable goodput for a second modulation and a second physical layer data transmission rate and reconfiguring the OS traffic shaping implementation based on the second maximum achievable goodput.

Identifying the second maximum achievable goodput for the second modulation and the second physical layer data transmission rate may include looking up the second modulation and second physical layer data transmission rate in a modulation to maximum achievable goodput table associated with a traffic shaping configuration agent and determining the second maximum achievable goodput for the second modulation and second physical layer data transmission rate. The first maximum achievable goodput may be defined at least in part on a percentage value of the first maximum achievable goodput. The percentage value of the first maximum achievable goodput may be user-configured.

As used in the present specification and in the appended claims, the term "traffic shaping" is meant to be understood broadly as any network bandwidth management technique used on computer networks which delays some or all datagrams to bring them into compliance with a desired traffic profile. Traffic shaping allows for controlling a rate at which data is sent on a network interface. Traffic shaping may better utilize network bandwidth and system resources.

As used in the present specification and in the appended claims, the term "adaptive modulation and coding (AMC)" is meant to be understood broadly as any matching of a modulation, coding and/or other signal and protocol parameters to conditions on a communications link such as on a radio or wireless link. AMC provides for the ability to adapt a modulation scheme and a coding rate to an instantaneous quality of the radio link. For example, as channel conditions worsen (e.g., cloud cover or weather impedes a radio link), a more robust modulation and coding scheme (MCS) may be employed, whereas a highly efficient MCS may be used if channel conditions are good. Thus, AMC allows a network transceiver to adapt modulation and encoding as conditions in the network change.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

Turning now to the figures, FIG. 1 is a diagram showing a high-level view of a network architecture 100 including nodes 106 configured with traffic shaping service elements, according to an example of the principles described herein. FIG. 1 also includes a component diagram of example components of a node 106 that includes the statically-configured Internet protocol (IP) network traffic shaping systems and methods for the adaptative modulation and coding (AMC) data links within the network architecture 100. The network architecture 100 includes a plurality of node(s) 106-1, 106-2, 106-3, 106-4, 106-5, 106-6, 106-7, . . . , 106-N, where N is any integer greater than or equal to 1 (collectively referred to herein as node(s) 106 unless specifically addressed otherwise). The nodes 106 are communicatively coupled to each other via direct communication paths or "links." In this example, N represents a number of nodes in an autonomous routing area (ARA), such as a wide area network (WAN), metropolitan area network (MAN), local area network (LAN), neighborhood area network (NAN), field area network (FAN), personal area network (PAN), among other types of networks. As an example, nodes 106 may be configured in a radio frequency (RF) mesh, a power line communication (PLC) mesh, or both.

As used in the present specification and in the appended claims, the term "link" is meant to be understood broadly as any direct communication path between two nodes (e.g., a "one hop" transmission that does not pass through or become propagated by another node). Each link may represent a plurality of channels or one or more variable data rate channels over which a node 106 is able to transmit or receive data. Each link may include multiple communication technologies, such as, for example, one or more RF communication technologies, one or more PLC communication technologies, or both (among other communication technologies). Thus, the communication technologies may utilize RF signals and/or PLC signals (among other types of signals) in communicating with one another and with other devices, systems, and networks such as, for example, a central office 102.

One or more channels may use a power line communication (PLC) system to communicate using a PLC communications technology. Thus, a link may include portions based on multiple communication medias including PLC portions. Likewise, various links may use multiple different PLC communications technologies (e.g., various modulation techniques, bandwidths, data rates, center frequencies, protocols, etc.).

The channels on a link may include a control channel and multiple data channels. In one example, the control channel may be utilized for communicating one or more messages between nodes to specify one of the data channels utilized to transfer data. Generally, transmissions on the control channel are shorter relative to transmissions on the data channels. Once specified, the nodes 106 may move to the data channel for communication.

Each of the nodes 106 may be implemented as, or associated with, any of a variety of computing devices such as, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, power line communication (PLC) transceivers, combinations of the foregoing, or any device couplable to a communication network and capable of sending and/or receiving data.

In this example, the nodes 106 may also be configured to communicate with one or more central processing facilities such as the central office 102 via an edge device (e.g., cellular relay, cellular router, edge router, destination oriented directed acyclic graph (DODAG) root, etc.) which serves as a connection point of the ARA to a backhaul network(s), such as the Internet or one or more public or private intranets. In the illustrated example, node 106-1 may serve as an edge device and/or cellular relay to relay communications from the other nodes 106-2 through 106-N of the ARA to and from the central office 102 via the network(s) 104.

In one example, the central office 102 may include one or more servers or other computing systems that include a security service such as authentication, authorization and accounting (AAA) server, a network registration service such as dynamic host configuration protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, other services, and combinations thereof. The network communication devices may register or interact with some or all these one or more central office systems. In one example, the one or more central office systems may implement a meter data management system to collect resource consumption data from the network communication devices of the network(s) 104, process the resource consumption data, provide data regarding resource consumption to customers, utilities, and others, and/or perform a variety of other functionality. In one example, the central office 102 may include other systems to implement other functionality, such as web services, cloud services, and so on. In one example, the central office 102 may be implemented as other types of devices, such as in the context of the Internet of Things (IoT) that allows a variety of devices to exchange data.

In one example, one or more of the central office 102, network(s) 104, nodes 106 and combinations thereof may be physically located in a single central location or may be distributed at multiple different locations. In one example, one or more of the central office 102, network(s) 104, nodes 106 and combinations thereof may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

As an example, node 106-N may be representative of each of the nodes 106 and may include one or more structural elements within the node 106 to mechanically support the printed circuit board (PCB) 120 and other devices such as a housing 126 to house a number of elements of the node 106. The housing 126 may house, for example, the PCB 120, a radio (e.g., a transceiver) 108, a PLC transceiver 110, a processing unit 112, a memory 116, and a network interface controller (NIC) 124. The PCB 120 may be referred to herein as a motherboard. Further one or more of the elements included with the PCB 120 may be embodied as a system-on-chip (SoC). The PCB 120 may include any device that mechanically supports and electrically connects electrical or electronic components using conductive traces, tracks, pads, and other features etched from one or more sheet layers of copper laminated onto and/or between sheet layers of a non-conductive, insulating substrate. The electrical or electronic components may be soldered onto the PCB 120 to both electrically connect and mechanically fasten them to the PCB 120. Elements that may be mechanically and/or electrically coupled to the PCB 120 may include the radio 108, the PLC transceiver 110, the processing unit 112 along with its processor(s) 114, and the memory 116, and the NIC 124 (sometimes referred to as a network interface card or a network adapter), among other elements.

The radio 108 may include a radio frequency (RF) transceiver that may be configured to receive RF signals associated with multiple different RF communication technologies (e.g., FSK, OQPSK, OFDM, CDMA, etc.) at a variety of data rates, and transmit RF signals via one or more of a plurality of RF communication technologies. The radio 108 may include a multiple protocol receiver and may be configured to listen for a plurality of different RF communication technologies in a parallel fashion across multiple links.

In one example, each of the nodes 106 may include a single radio 108 configured to send and receive data on multiple different channels, such as the control channel and multiple data channels of each communication link. The radio 108 may also be configured to implement a plurality of different data rates, protocols, signal strengths, and/or power levels. The network architecture 100 may represent a heterogeneous network of nodes 106, in that the nodes 106 may include different types of nodes (e.g., smart meters, cellular relays, sensors, etc.), different generations or models of nodes, and/or nodes that otherwise are capable of transmitting on different channels and using different communication technologies, data rates, protocols, signal strengths, and/or power levels.

The power line communication (PLC) transceiver 110 is configured to transmit and/or receive one or more communication signals on electrical power wiring, including local power wiring and long distance high voltage transmission lines. The PLC transceiver 110 may transmit and/or receive different types of power line communications that include one or more PLC communication technologies (e.g., narrowband PLC, broadband PLC, power line digital subscriber line (PDSL), power line telecom (PLT), power line networking (PLN), broadband over power lines (BPL), etc.) having one or more frequency bands, channels, data rates and/or types of modulation that may depend on the propagation characteristics of the power wiring used.

The processing unit 112 may be coupled to the radio 108, the PLC transceiver 110, the memory 116, and the NIC 124, and may include one or more processor(s) 114 communicatively coupled to the memory 116. The memory 116 may be configured to store one or more software and/or firmware modules 118, which are executable on the processor(s) 114 to implement various functions. While the modules are described herein as being software and/or firmware executable on a processor, in other examples, any or all of the modules may be implemented in whole or in part by hardware (e.g., as an application specific integrated circuit (ASIC), a specialized processing unit, digital signal processor, etc.) to execute the described functions. In the example of FIG. 1, the memory 116 includes any software and/or firmware executable to bring about any function of the node 106 as a utility meter and/or a device within a network of nodes 106 including send and receive communications, detect utility consumption, and process data, among other functions of a utility meter. However, the memory 116 may include any software and/or firmware executable to bring about any functions of the node 106 described herein, and including the configuration, reconfiguration, and updating of a traffic shaping static configuration.

The memory 116 may store portions, or components, of traffic shaping services 120. For instance, the traffic shaping services 120 of the software and/or firmware modules 118 may include a traffic shaping configuration agent 122 to, when executed by the processor(s) 114, bring about the statically-configured traffic shaping implementations described herein. The traffic shaping configuration agent 122 may, for example, fetch, from a neighbor routing table stored on a NIC 124, data defining a first modulation of a data link and a first physical layer (Layer 1 (L1)) data transmission rate associated with a first media access control (MAC) address, identify a first maximum achievable goodput for the first modulation and the first physical layer data transmission rate, and reconfigure an operating system (OS) traffic shaping implementation based on the first maximum achievable goodput.

The memory 116 may include computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

The NICs 124 may include any computer hardware component that connects a computer (e.g., the node 106) to a computer network. The NICs 124 may store and execute an OS using a processor and memory onboard at the NICs 124. The NICs 124 may be communicatively coupled to the PCB 120 and/or the processing unit 112 in order to interact with the software and/or firmware module(s) 118 in bringing about the functions described herein. The NIC 124 may store in a data storage device of the NIC 124 (not shown) data including, for example, a neighbor routing table, data defining a number of modulations of a data link and a number of physical layer data transmission rates associated with a number of media access control (MAC) addresses. In one example, the neighbor routing table, the data defining the number of modulations of a data link and the number of physical layer data transmission rates associated with the number of MAC addresses may be redundantly stored in the memory 116.

The network(s) 104 may represent any number and types of networks, which may themselves include wireless or wired networks, or a combination thereof. The network(s) 104 may be a collection of individual networks interconnected with each other and functioning as a single large network (e.g., the Internet and/or one or more intranets). Further, the individual networks may be wireless or wired networks, or a combination thereof. In one example, the network(s) may be implemented in the context of an Internet of Things (IoT) in which the central office 102, the network (s) 104, the nodes 106 and other devices may include one or more groups of physical computing devices with a number of sensors, processing ability, software, and other technologies that connect and exchange data with other devices and systems over the network(s) 104 (e.g., the Internet or other communications networks). In one example, one or more of the nodes 106 may serve as a gateway device such as, for example, an IoT gateway. In this example, the gateway may utilize RF mesh technologies as an uplink.

The central office 102 may be implemented by one or more computing devices, such as servers, personal computers, and laptop computers, among others. The one or more computing devices may be equipped with one or more processor(s) communicatively coupled to memory. In some examples, the central office 102 includes a centralized meter data management system which performs processing, analysis, storage, and/or management of data received from one or more of the nodes 106. For example, the central office 102 may process, analyze, store, and/or manage data obtained from a smart utility meter, sensor, control device, router, regulator, server, relay, switch, valve, and/or other nodes. Although the example of FIG. 1 illustrates the central office 102 in a single location, in some examples the central office may be distributed amongst multiple locations and/or may be eliminated entirely (e.g., in the case of a highly decentralized distributed computing platform).

Figure 2:
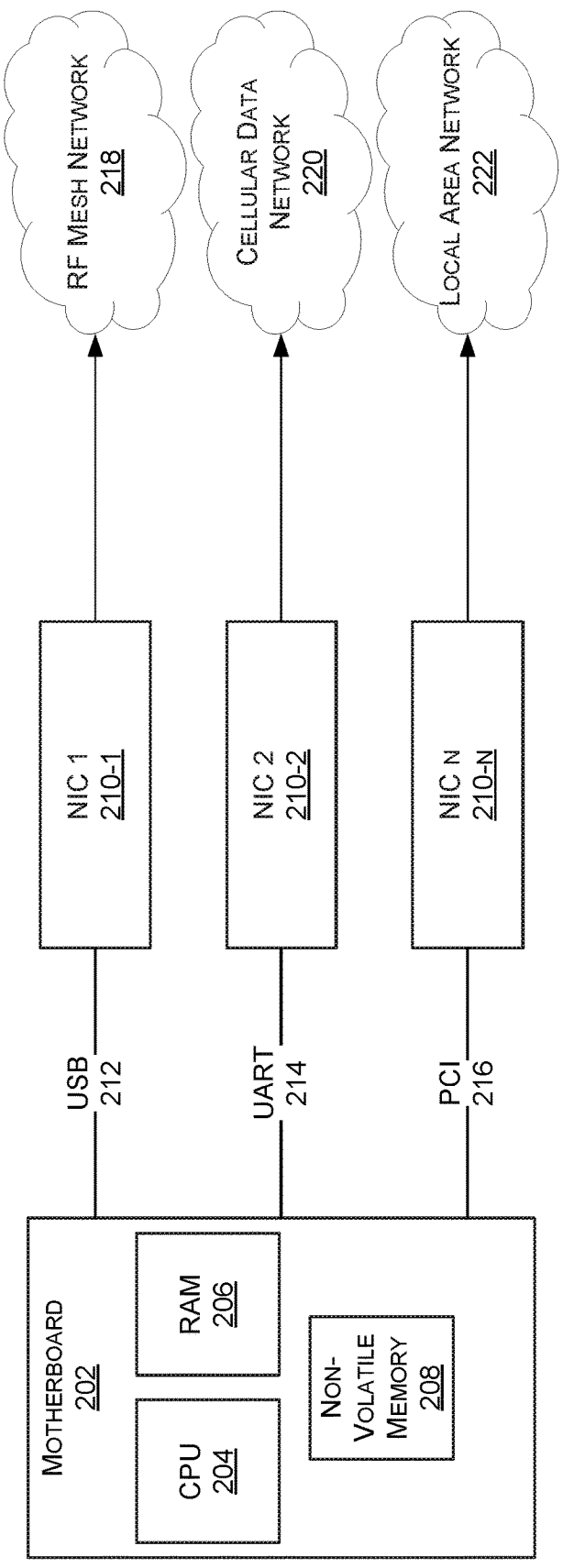
FIG. 2 is a diagram showing a high-level view of hardware associated with the nodes, according to an example of the principles described herein.

Having described the environment in which the node 106 operates, the physical elements of the node 106 will now be described in connection with FIGS. 2 through 4. FIG. 2 is a diagram showing a high-level view of hardware 200 associated with the nodes 106, according to an example of the principles described herein. The hardware 200 may include a motherboard 202 such as the PCB 120 of FIG. 1. The motherboard 202 may include a central processing unit (CPU) 204 (e.g., the processing unit 112 of FIG. 1), and RAM 206 and non-volatile memory 208 that may be implemented as part of, for example, the memory 116 of FIG. 1. A number of NIC(s) 210-1, 210-2, ... 210-N, where N is any integer greater than or equal to 1 (collectively referred to herein as NIC(s) 210 unless specifically addressed otherwise) may also be included within the hardware 200 and may be included as the NIC(s) 124 of FIG. 1. The NICs may store and execute an operating system (OS) using a processor and memory.

The motherboard 202 may be communicatively coupled to a number of different types of networks via the NICs 210. For example, the motherboard 202 may be communicatively coupled to an RF mesh network 218, a cellular data network 220, and LAN 222 and/or a number of other networks via the NICs 210. In one example, the NICs 210 may be used to allow the motherboard 202 to reach a specific one of the networks 218, 220, 222. Each of the NICs 210 may be coupled to the motherboard 202 via a number of different local communication protocols and their respective hardware, software, and/or firmware. For example, the NICs 210 may be coupled to the motherboard 202 via a universal serial bus (USB)-based protocol connection 212, a universal asynchronous receiver-transmitter (UART)-based protocol connection 214, a peripheral component interconnect (PCI)-based connection 216, or other local communication protocols.

Traffic shaping is available for use in a variety of different data link layer types such as, for example, Ethernet (IEEE 802.3 standards), Wi-Fi (IEEE 802.11 standards), digital subscriber line (DSL) standards. Further, an advantage of network layer traffic shaping includes the ubiquity of an IP networking stack of general-purpose or embedded devices executing Linux-based operating systems which allows a very large number of devices to utilize network layer traffic shaping. Still further, the motherboard 202 may include relatively abundant data processing and memory resources that allows for more sophisticated features such as, for example, class-based traffic shaping where data packets are classified based on one or more criteria. Classification of the data packets may be done using the header fields of the data packets. However, the traffic shaping implementations may not be aware of specifics related to the link layer that may improve the performance of a traffic shaping implementation.

Implementation of traffic shaping at the data link layer may be tailored to the specifics of the data link layer and is, therefore, an effective way to perform traffic shaping. However, traffic shaping at the link layer may be relatively ineffective due to more constrained resources that would lead to a relatively less sophisticated solution. Further, a first implementation of traffic shaping at a first type of link layer may not be used on a second type of link layer. For example, the NIC 210-1 associated with the RF mesh network 218 may have a QoS policy but may not have the capability of traffic shaping because the NIC 210-1 does not have the resources to provide traffic shaping processing.

In order to provide statically-configured IP network traffic shaping for AMC data links, the motherboard 202 and the NIC 210 may cooperate by sharing data, and processing and storing different types of data. FIG. 3 is a diagram showing software and/or firmware 300 associated with the nodes 106, according to an example of the principles described herein. The motherboard 202 may include the traffic shaping configuration agent 122 as described in FIG. 1. The traffic shaping configuration agent 122 may be communicatively coupled to an IP network stack 302. The IP network stack may include any implementation of a computer networking protocol suite defining the communication protocols, and the stack is the software implementation of those communication protocols. A local communications stack 304 that utilizes the USB-based protocol connection 212, the UART-based protocol connection 214, the PCI-based connection 216, or other local communication protocol-based connections may be included to communicate with a corresponding local communications stack 310 of the NIC 210. Like the local communications stack 304 of the motherboard 202, the local communications stack 310 of the NIC 210 may utilize the USB-based protocol connection 212, the UART-based protocol connection 214, the PCI-based connection 216, or other local communication protocol-based connections may be included to communicate with the local communications stack 304 of the motherboard 202.

The NIC 210 may include a packet processing module 308 to send and receive data packets to and from the network stack 302 at 324. The local communication stack 310 of the NIC 210 and the local communication stack 304 of the motherboard 202 may facilitate the transmission of the data packets between the packet processing module 308 and the IP networking stack 302 at 324.

Further, the NIC 210 may include a NIC MAC address 312 to identify the NIC 210 within the network(s) 104. The NIC 210 may also include a neighbor routing table 306 that includes a number of entries 314 that identify a number of nodes 106 that are neighbors to a given node 106. The neighbor routing table 306 may include MAC address(es) 316 of the neighbor nodes 106, a frequency modulation scheme 318 for each of the entries 314, and a physical layer (PHY or L1) data transmission rate 320. The frequency modulation scheme 318 may include any type of encoding of information in a carrier wave by varying the instantaneous frequency of the carrier wave. In one example, the frequency modulation scheme 318 may include, for example, frequency-shift keying (FSK) modulation scheme, Gaussian frequency-shift keying (GFSK) modulation scheme, orthogonal frequency-division multiplexing (OFDM) modulation scheme, other frequency modulation schemes, and combinations thereof.

The physical layer data transmission rate 320 may include a maximum speed that data can move across a link between two computing devices within the network(s) 104. The physical layer data transmission rate 320 may be measured in kilobits per second (Kbps), megabits per second (Mbps), and other measurements used for data transmission rates.

Traffic shaping on an adaptive modulation and coding (AMC) data link may include, with the traffic shaping configuration agent 122, fetching 322, from the neighbor routing table 306 stored on the NIC 210, data defining a first frequency modulation scheme 318 (e.g., modulation) of a data link and a first physical layer data transmission rate 320 associated with a first MAC address 316 of a first neighbor. In one example the local communication stack 310 of the NIC 210 and the local communication stack 304 of the motherboard 202 may facilitate a number of management operations between the neighbor routing table 306 and the traffic shaping configuration agent 122 such as the fetching operation at 322. The traffic shaping configuration agent 122 may also identify a first maximum achievable goodput for the first frequency modulation scheme 318 and the first physical layer data transmission rate 320. A traffic shaping implementation of an OS may be reconfigured based on the first maximum achievable goodput. More details regarding the function of the motherboard 202 and the NIC 210 is provided herein.

Figure 3:
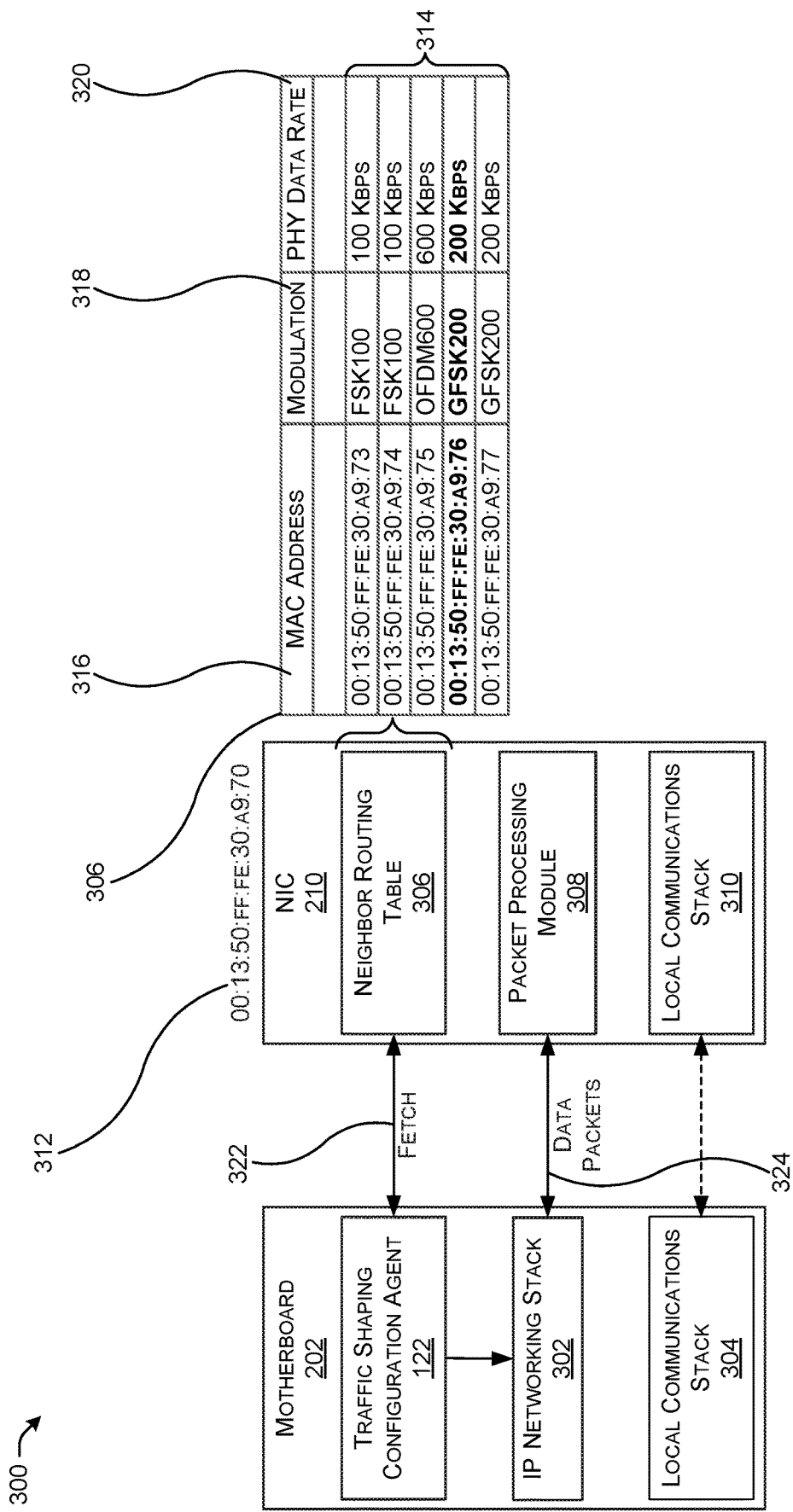
FIG. 3 is a diagram showing software and/or firmware associated with the nodes, according to an example of the principles described herein.

As depicted in FIG. 3, the neighbor routing table 306 indicates the neighbor nodes 106 that the NIC 210 of an originating node 106 may be able to identify. The neighbor routing table 306 may be stored in memory of the NIC 210 and may be updated at any interval of time and/or as the topology of the network(s) 104 changes such as with the addition or removal of one or more nodes 106. In one example, traffic shaping parameters may be updated to reflect conditions affecting the communication channel.

As depicted in the neighbor routing table 306, the NIC 210 is able to communicate with the neighbor nodes 106 via the frequency modulation scheme 318 indicated for each MAC address 316 and at the associated physical layer data transmission rate 320. Among the neighbor nodes listed in the neighbor routing table 306, one of the neighbor nodes 106 may have a designated role as the next hop node 106 up in the data stream to the network(s) 104. For example, for the originating node 106-N, this next hop node may include node 106-6 in the example of FIG. 1 and its corresponding MAC address 316 may be 00:13:50:FF:FE:30:A9:76 which is highlighted in the neighbor routing table 306 of FIG. 3. As described in more detail herein, this next hop node 106-6 may serve as a basis by which the OS traffic shaping implementation may be reconfigured.

Figure 4:
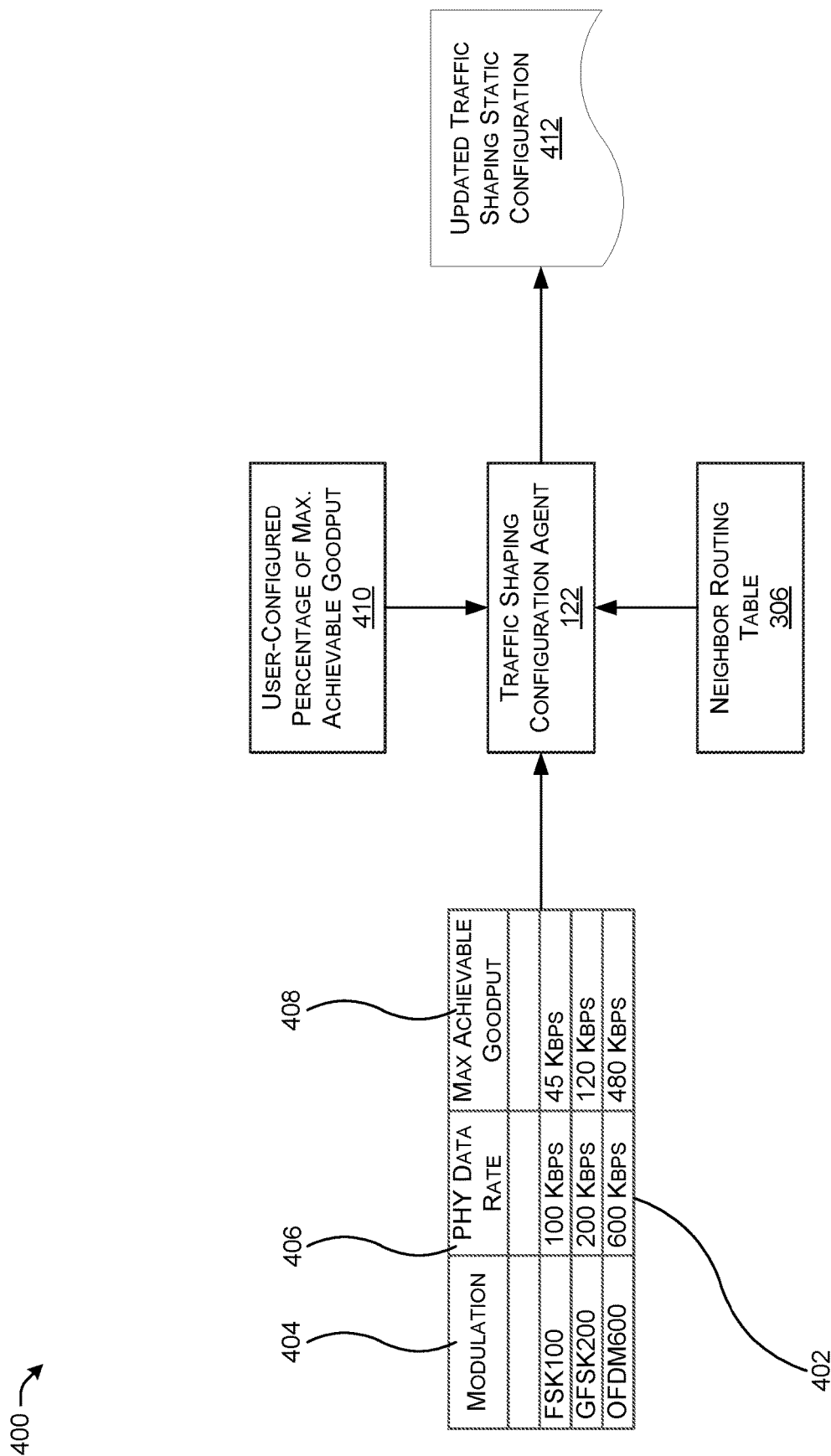
FIG. 4 is a diagram showing a traffic shaping configuration agent associated with the nodes to update traffic shaping static configuration, according to an example of the principles described herein.

FIG. 4 is a diagram showing a traffic shaping configuration agent 122 associated with the nodes 106 to update traffic shaping static configuration, according to an example of the principles described herein. A node 106 may store a modulation to maximum achievable goodput table 402 (referred to herein as the modulation to goodput table) in, for example, the memory 116 of FIG. 1 or the RAM 206 and/or non-volatile memory 208 of FIG. 2. The modulation to goodput table 402 may be hardcoded into the data storage device such that the modulation to goodput table 402 is embedded directly into the source code of a program such as an OS of the node 106 or other executable object, as opposed to obtaining the data from external sources or generating the code at runtime. Thus, in one example, the modulation to goodput table 402 may be modified by editing the source code and recompiling the executable. The indelibility of the modulation to goodput table 402 ensures that the reconfiguration of the OS traffic shaping implementation is based on the same data within the modulation to goodput table 402 in every instance.

The modulation to goodput table 402 may include a frequency modulation scheme 404, a physical layer data transmission rate 406, and values defining a maximum achievable goodput 408 corresponding to each respective frequency modulation scheme 404 and physical layer data transmission rate 406. In one example, the values in each corresponding entry of the modulation to goodput table 402 may be determined through empirical testing in a lab or other testing environment. Thus, the values for the maximum achievable goodput 408 may not actually be achieved since application of the nodes 106 in a non-ideal, real-life environment will cause the actual values of a maximum achievable goodput to be limited. However, the real-life values of the maximum achievable goodput may, in one example, be close enough to the values of the maximum achievable goodput 408 to allow for traffic shaping to occur based on the modulation to goodput table 402.

User-configured percentage of maximum achievable goodput 410 (referred to herein as user-configured percentage input) may be used as a second input to the traffic shaping configuration agent 122 in addition to the modulation to goodput table 402. The user-configured percentage input 410 may alter the maximum achievable goodput that is used in traffic shaping to a percentage thereof and may be user-defined. Although in many implementations, a user may define the traffic shaping configuration agent 122 as 100% of the maximum achievable goodput 408. However, in some implementations or deployments, the network(s) 104 may be configured as a star topology network, for example. In this example, all the nodes 106 and their respective NICs 124 will be communicating with a same next hop node 106. In this situation, it may be beneficial for the originating node 106 to use only 50% of the maximum achievable goodput 408.

The neighbor routing table 306 may server as a third input to the traffic shaping configuration agent 122. The traffic shaping configuration agent 122 may fetch from the data defining a first frequency modulation scheme 318 of a data link and the first physical layer data transmission rate 320 associated with a first MAC address 316 of a first neighbor (e.g., the next hop node 106-6) as described above in connection with FIG. 3. The first frequency modulation scheme 318 and the first physical layer data transmission rate 320 may be looked up in the modulation to goodput table 402 to find corresponding values for the frequency modulation scheme 404 and a physical layer data transmission rate 406. Once the corresponding values are found, the associated values defining the maximum achievable goodput 408 for those entries may be returned to the traffic shaping configuration agent 122. In one example, the maximum achievable goodput 408 identified in the modulation to goodput table 402 based on the first frequency modulation scheme 318 and the first physical layer data transmission rate 320 may be modified based on the user-configured percentage input 410. At 412, the traffic shaping static configuration may be updated based on the processing performed by the traffic shaping configuration agent 122. Traffic shaping may then be performed based on the updated traffic shaping static configuration 412.

Figure 5:
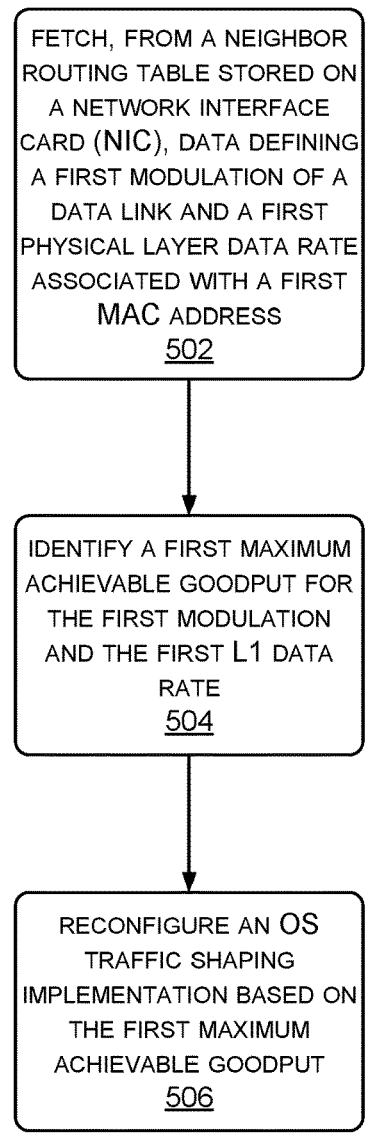
FIG. 5 illustrates a flow diagram of an example method for traffic shaping on an adaptive modulation and coding (AMC) data link, according to an example of the principles described herein.

FIG. 5 illustrates a flow diagram of an example method 500 for traffic shaping on an adaptive modulation and coding (AMC) data link, according to an example of the principles described herein. The method 500 may include, with the traffic shaping configuration agent 122, fetching, from the neighbor routing table 306 stored on the NIC 124, data defining a first frequency modulation scheme 318 and a first physical layer data transmission rate 320 associated with a first media access control (MAC) address at 502. At 504, the traffic shaping configuration agent 122 may identify a first maximum achievable goodput 408 for the first frequency modulation scheme 318 and the first physical layer data transmission rate 320. Identifying the first maximum achievable goodput 408 for the first frequency modulation scheme 318 and the first physical layer data transmission rate 320 may include looking up the first frequency modulation scheme 318 and the first physical layer data transmission rate 320 in a modulation to goodput table associated with the traffic shaping configuration agent, and determining the first maximum achievable goodput 408 for the first frequency modulation scheme 318 and the first physical layer data transmission rate 320. At 506, the traffic shaping configuration agent 122 may update or reconfigure an operating system (OS) traffic shaping implementation based on the first maximum achievable goodput 408.

Figure 6:
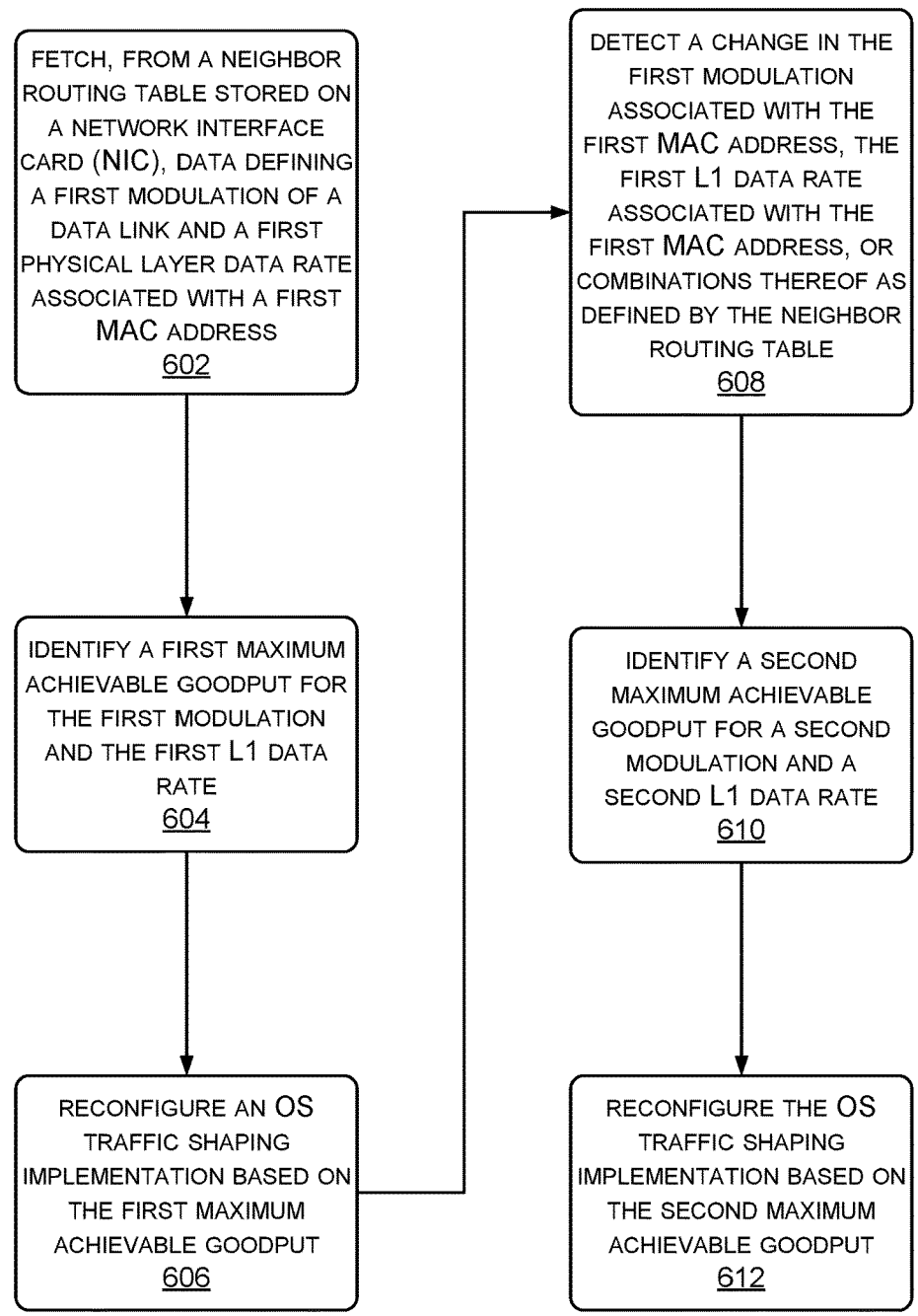
FIG. 6 illustrates a flow diagram of an example method for traffic shaping on an AMC data link, according to an example of the principles described herein.

FIG. 6 illustrates a flow diagram of an example method 600 for traffic shaping on an AMC data link, according to an example of the principles described herein. The method 600 may include, with the traffic shaping configuration agent 122, fetching, from the neighbor routing table 306 stored on the NIC 124, data defining a first frequency modulation scheme 318 and a first physical layer data transmission rate 320 associated with a first media access control (MAC) address at 602. At 604, the traffic shaping configuration agent 122 may identify a first maximum achievable goodput 408 for the first frequency modulation scheme 318 and the first physical layer data transmission rate 320. Further, at 606, the traffic shaping configuration agent 122 may update or reconfigure an operating system (OS) traffic shaping implementation based on the first maximum achievable goodput 408.

At 608, the method 600 may further include detecting a change in the first frequency modulation scheme 318 associated with the first MAC address 316, the first physical layer data transmission rate 320 associated with the first MAC address 316, or combinations thereof as defined by the neighbor routing table 306. As similarly performed at 604, the method 600 may include identifying a second maximum achievable goodput 408 for a second frequency modulation scheme 318 and a second physical layer data transmission rate 320 at 610. At 612, the traffic shaping configuration agent 122 may update or reconfigure the OS traffic shaping implementation based on the second maximum achievable goodput 408.

In one example, identifying the second maximum achievable goodput 408 for the second frequency modulation scheme 318 and the second physical layer data transmission rate 320 at 610 may include looking up the second frequency modulation scheme 318 and second physical layer data transmission rate 320 in the modulation to goodput table 402 associated with the traffic shaping configuration agent 122. The method 600 may further include determining the second maximum achievable goodput 408 for the second frequency modulation scheme 318 and second physical layer data transmission rate 320.

In one example, the maximum achievable goodput 408 may be further defined at least in part on a percentage value of the maximum achievable goodput 408. As mentioned herein, the percentage value of the maximum achievable goodput may be user-configured as indicated at 410 of FIG. 4.

Figure 7:
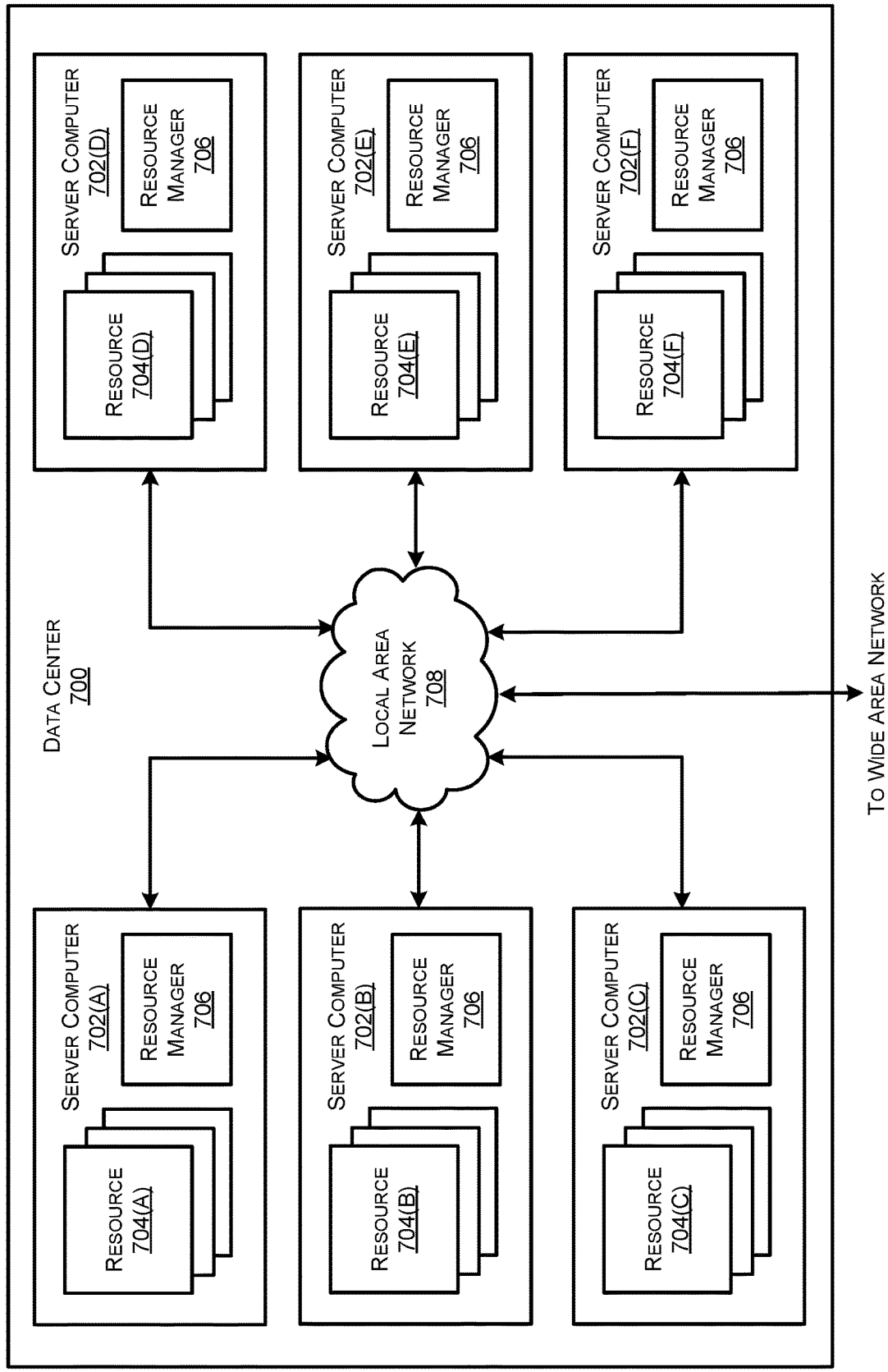
FIG. 7 illustrates a computing system diagram illustrating a configuration for a data center that may be utilized to implement aspects of the technologies disclosed herein.

FIG. 7 illustrates a computing system diagram illustrating a configuration for a data center 700 that may be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, any type of networked device described herein. Although described as servers, the server computers 702 may comprise any type of networked device, such as servers, switches, routers, hubs, bridges, gateways, modems, repeaters, access points, etc.

The server computers 702 may be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, virtual private networks (VPNs), and others. Some of the server computers 702 may also be configured to execute a resource manager 706 capable of instantiating and/or managing the computing resources. In the case of VM instances, for example, the resource manager 706 may be a hypervisor or another type of program configured to enable the execution of multiple VM instances on a single server computer 702. Server computers 702 in the data center 700 may also be configured to provide network services and other types of services.

In the example data center 700 shown in FIG. 7, an appropriate LAN 708 is also utilized to interconnect the server computers 702A-702F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 700, between each of the server computers 702A-702F in each data center 700, and, potentially, between computing resources in each of the server computers 702. It may be appreciated that the configuration of the data center 700 described with reference to FIG. 7 is merely illustrative and that other implementations may be utilized.

In some examples, the server computers 702 and/or the computing resources 704 may each execute/host one or more tenant containers and/or virtual machines to perform techniques described herein.

In some instances, the data center 700 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 704 provided by the cloud computing network may include various types of computing resources, such as data processing resources like tenant containers and VM instances, data storage resources, networking resources, data communication resources, network services, VPN instances, and the like.

Each type of computing resource 704 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 704 not mentioned specifically herein.

The computing resources 704 provided by a cloud computing network may be enabled in one example by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 may also be located in geographically disparate locations. One illustrative example for a data center 700 that may be utilized to implement the technologies disclosed herein is described herein with regard to, for example, FIGS. 1 through 6.

Figure 8:
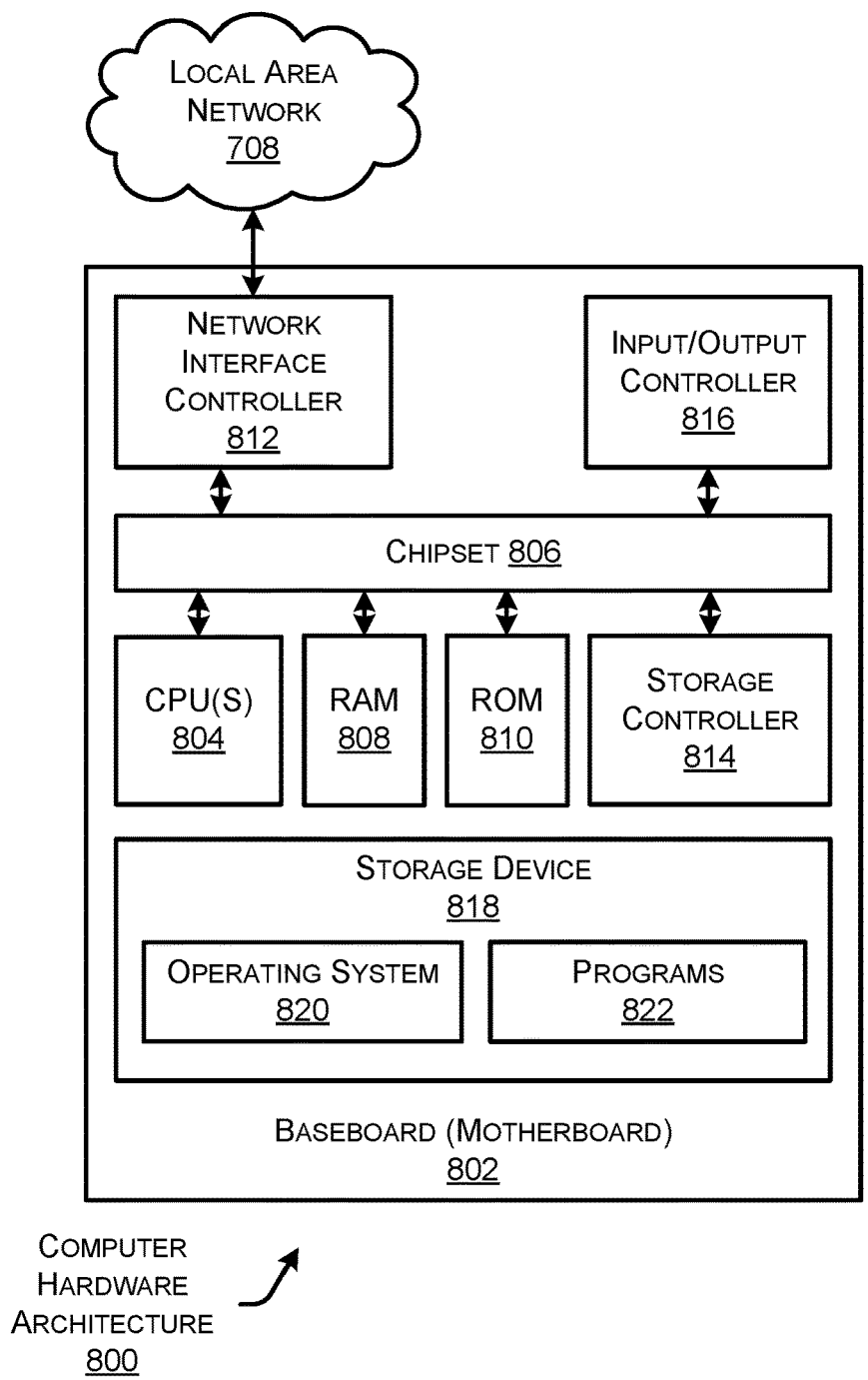
FIG. 8 illustrates a computer architecture diagram showing an example computer hardware architecture for implementing a computing device that may be utilized to implement aspects of the various technologies presented herein.

FIG. 8 illustrates a computer architecture diagram showing an example computer hardware architecture 800 for implementing a computing device that may be utilized to implement aspects of the various technologies presented herein. The computer hardware architecture 800 shown in FIG. 8 illustrates the central office 102, network(s) 104, the nodes 106, the NIC(s) 124, and/or other systems or devices associated with the network architecture 100 and/or remote from the network architecture 100, a workstation, a desktop computer, a laptop, a tablet, a network appliance, an e-reader, a smartphone, or other computing device, and may be utilized to execute any of the software components described herein. The computer 800 may, in some examples, correspond to a network device (e.g., the client device 102, network(s) 104, the nodes 106, the NIC(s) 124, described herein, and may comprise networked devices such as servers, switches, routers, hubs, bridges, gateways, modems, repeaters, access points, etc.

The computer 800 includes a baseboard 802, or "motherboard," which is a printed circuit board to which a multitude of components or devices may be connected by way of a system bus or other electrical communication paths. In one illustrative configuration, one or more central processing units (CPUs) 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM may also store other software components necessary for the operation of the computer 800 in accordance with the configurations described herein.

The computer 800 may operate in a networked environment using logical connections to remote computing devices and computer systems through a network, such as the central office 102, network(s) 104, the nodes 106, the NIC(s) 124, among other devices. The chipset 806 may include functionality for providing network connectivity through a Network Interface Controller (NIC) 812, such as a gigabit Ethernet adapter. The NIC 812 is capable of connecting the computer 800 to other computing devices within the network architecture 100 and external to the network architecture 100. It may be appreciated that multiple NICs 812 may be present in the computer 800, connecting the computer to other types of networks and remote computer systems. In some examples, the NIC 812 may be configured to perform at least some of the techniques described herein, such as packet redirects and/or other techniques described herein.

The computer 800 may be connected to a storage device 818 that provides non-volatile storage for the computer. The storage device 818 may store an operating system 820, programs 822 (e.g., any computer-readable and/or computer-executable code described herein), and data, which have been described in greater detail herein. The storage device 818 may be connected to the computer 800 through a storage controller 814 connected to the chipset 806. The storage device 818 may consist of one or more physical storage units. The storage controller 814 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 800 may store data on the storage device 818 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 818 is characterized as primary or secondary storage, and the like.

For example, the computer 800 may store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the storage device 818 by detecting the physical states or characteristics of one or more particular locations within the physical storage units.

In addition to the storage device 818 described above, the computer 800 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 800. In some examples, the operations performed by the central office 102, network(s) 104, the nodes 106, the NIC(s) 124, and/or any components included therein, may be supported by one or more devices similar to computer 800. Stated otherwise, some or all of the operations performed by the central office 102, network(s) 104, the nodes 106, the NIC(s) 124, and/or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 818 may store an operating system 820 utilized to control the operation of the computer 800. According to one example, the operating system 820 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 818 may store other system or application programs and data utilized by the computer 800.

In one example, the storage device 818 or other computer-readable storage media is encoded with computer-executable instructions which, when loaded into the computer 800, transform the computer from a general-purpose computing system into a special-purpose computer capable of implementing the examples described herein. These computer-executable instructions transform the computer 800 by specifying how the CPUs 804 transition between states, as described above. According to one example, the computer 800 has access to computer-readable storage media storing computer-executable instructions which, when executed by the computer 800, perform the various processes described above with regard to FIGS. 1 through 7. The computer 800 may also include computer-readable storage media having instructions stored thereupon for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, an input/output controller 816 may provide output to a display, such as a computer monitor, a flat-panel display, a digital projector, a printer, or other type of output device. It will be appreciated that the computer 800 might not include all of the components shown in FIG. 8, may include other components that are not explicitly shown in FIG. 8, or might utilize an architecture completely different than that shown in FIG. 8.

As described herein, the computer 800 may comprise one or more of the central office 102, network(s) 104, the nodes 106, the NIC(s) 124, and/or other systems or devices associated with the network architecture 100 and/or remote from the network architecture 100. The computer 800 may include one or more hardware processor(s) such as the CPUs 804 configured to execute one or more stored instructions. The CPUs 804 may comprise one or more cores. Further, the computer 800 may include one or more network interfaces configured to provide communications between the computer 800 and other devices, such as the communications described herein as being performed by the central office 102, network(s) 104, the nodes 106, the NIC(s) 124, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. The programs 822 may comprise any type of programs or processes to perform the techniques described in this disclosure for the central office 102, network(s) 104, the nodes 106, the NIC(s) 124 as described herein. The programs 822 may enable the devices described herein to perform various operations.

CONCLUSION

The examples described herein provide a computing system that is, at all times, aware of the PHY modulation utilized by an AMC network interface card (NIC) and is able to adapt a shaping rate of a traffic shaping configuration when a modulation change occurs. The systems and methods may dynamically adjust the traffic shaping configuration based on a modulation-to-maximum-goodput mapping table and/or based on computing an optimal shaping rate that is based on data packet transmission statistics for the link.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of traffic shaping on an adaptive modulation and coding (AMC) data link, comprising: with a traffic shaping configuration agent:
fetching, from a neighbor routing table stored on a network interface card (NIC), data defining a first modulation of a data link and a first physical layer data transmission rate associated with a first media access control (MAC) address;
identifying a first maximum achievable goodput for the first modulation and the first physical layer data transmission rate;
reconfiguring an operating system (OS) traffic shaping implementation based on the first maximum achievable goodput;
detecting a change in the first modulation associated with the first MAC address and the first physical layer data transmission rate associated with the first MAC address as defined by the neighbor routing table;
identifying a second maximum achievable goodput for a second modulation and a second physical layer data transmission rate; and
reconfiguring the OS traffic shaping implementation based on the second maximum achievable goodput.

2. The method of claim 1, wherein identifying the first maximum achievable goodput for the first modulation and the first physical layer data transmission rate comprises:
looking up the first modulation and first physical layer data transmission rate in a modulation to maximum achievable goodput table associated with the traffic shaping configuration agent; and
determining the first maximum achievable goodput for the first modulation and first physical layer data transmission rate.

3. The method of claim 2, wherein the modulation to maximum achievable goodput table is hardcoded to a data storage device associated with the traffic shaping configuration agent.

4. The method of claim 1, wherein identifying the second maximum achievable goodput for the second modulation and the second physical layer data transmission rate comprises:
looking up the second modulation and second physical layer data transmission rate in a modulation to maximum achievable goodput table associated with the traffic shaping configuration agent; and
determining the second maximum achievable goodput for the second modulation and second physical layer data transmission rate.

5. The method of claim 1, wherein the first maximum achievable goodput is defined at least in part on a percentage value of the first maximum achievable goodput.

6. The method of claim 5, wherein the percentage value of the first maximum achievable goodput is user-configured.

7. A device comprising:
a processor; and
a non-transitory computer-readable media storing instructions that, when executed by the processor, cause the processor to perform operations comprising:
fetching, from a neighbor routing table stored on a network interface card (NIC), data defining a first modulation of a data link and a first physical layer data transmission rate associated with a first media access control (MAC) address;
identifying a first maximum achievable goodput for the first modulation and the first physical layer data transmission rate;

reconfiguring an operating system (OS) traffic shaping implementation based on the first maximum achievable goodput;

detecting a change in the first modulation associated with the first MAC address and the first physical layer data transmission rate associated with the first MAC address as defined by the neighbor routing table;

identifying a second maximum achievable goodput for a second modulation and a second physical layer data transmission rate; and reconfiguring the OS traffic shaping implementation based on the second maximum achievable goodput.

8. The device of claim 7, wherein identifying the first maximum achievable goodput for the first modulation and the first physical layer data transmission rate comprises:

looking up the first modulation and first physical layer data transmission rate in a modulation to maximum achievable goodput table associated with a traffic shaping configuration agent; and determining the first maximum achievable goodput for the first modulation and first physical layer data transmission rate.

9. The device of claim 8, wherein the modulation to maximum achievable goodput table is hardcoded to a data storage device associated with the traffic shaping configuration agent.

10. The device of claim 7, wherein identifying the second maximum achievable goodput for the second modulation and the second physical layer data transmission rate comprises:

looking up the second modulation and second physical layer data transmission rate in a modulation to maximum achievable goodput table associated with a traffic shaping configuration agent; and determining the second maximum achievable goodput for the second modulation and second physical layer data transmission rate.

11. The device of claim 7, the operations further comprising:

defining the first maximum achievable goodput based at least in part on a percentage value of the first maximum achievable goodput, the percentage value of the first maximum achievable goodput being user-configured.

12. The device of claim 7, wherein the device is an edge device.

13. A non-transitory computer-readable medium storing instructions that, when executed, cause a processor to perform operations, comprising:

fetching, from a neighbor routing table stored on a network interface card (NIC), data defining a first modulation of a data link and a first physical layer data transmission rate associated with a first media access control (MAC) address;

identifying a first maximum achievable goodput for the first modulation and the first physical layer data transmission rate;

reconfiguring an operating system (OS) traffic shaping implementation based on the first maximum achievable goodput;

detecting a change in the first modulation associated with the first MAC address and the first physical layer data transmission rate associated with the first MAC address as defined by the neighbor routing table;

identifying a second maximum achievable goodput for a second modulation and a second physical layer data transmission rate; and reconfiguring the OS traffic shaping implementation based on the second maximum achievable goodput.

14. The non-transitory computer-readable medium of claim 13, wherein identifying the first maximum achievable goodput for the first modulation and the first physical layer data transmission rate comprises:

looking up the first modulation and first physical layer data transmission rate in a modulation to maximum achievable goodput table associated with a traffic shaping configuration agent; and determining the first maximum achievable goodput for the first modulation and first physical layer data transmission rate.

15. The non-transitory computer-readable medium of claim 14, wherein the modulation to maximum achievable goodput table is hardcoded to a data storage device associated with the traffic shaping configuration agent.

16. The non-transitory computer-readable medium of claim 13, wherein identifying the second maximum achievable goodput for the second modulation and the second physical layer data transmission rate comprises:

looking up the second modulation and second physical layer data transmission rate in a modulation to maximum achievable goodput table associated with a traffic shaping configuration agent; and determining the second maximum achievable goodput for the second modulation and second physical layer data transmission rate.

17. The non-transitory computer-readable medium of claim 13, wherein:

the first maximum achievable goodput is defined at least in part on a percentage value of the first maximum achievable goodput, and the percentage value of the first maximum achievable goodput is user-configured.

18. The method of claim 1, wherein the first maximum achievable goodput and the second maximum achievable goodput are defined at least in part by a physical environment in which at least one node is operating.

19. The device of claim 7, wherein the first maximum achievable goodput and the second maximum achievable goodput are defined at least in part by a physical environment in which at least one node is operating.

20. The non-transitory computer-readable medium of claim 13, wherein the first maximum achievable goodput and the second maximum achievable goodput are defined at least in part by a physical environment in which at least one node is operating.

* * * * *